Oct. 26, 1926.

A. C. WHIDDEN 1,604,623

TRACTOR HITCH

Filed Sept. 18, 1925

Witness
C. C. Holly

Inventor
Austin C. Whidden
by James R. Townsend
his atty.

Patented Oct. 26, 1926.

1,604,623

UNITED STATES PATENT OFFICE.

AUSTIN C. WHIDDEN, OF LANCASTER, CALIFORNIA.

TRACTOR HITCH.

Application filed September 18, 1925. Serial No. 57,113.

This invention relates to a novel tractor hitch particularly applicable to tractors of the Fordson type.

An object of my invention is to provide a novel attachment which may be easily and quickly attached to tractors now in common use to provide a hitch to which various implements may be connected to be drawn by said tractor in various manners that have heretofore been practically impossible with the type or style of hitch with which such tractors are commonly equipped.

Another object is to provide a novel side pull hitch for tractors and which may be collapsed to a width not exceeding the width of the tractor to which it is connected.

I have found my tractor hitch particularly advantageous in that it enables me to draw a hay rake or the like with a tractor and thereby enables one man to rake and bunch or shock a field of the raked hay in a much shorter space of time than has heretofore been possible. By means of my hitch the rake may be positioned to one side of the tractor so that the tractor does not travel in the swath of the rake, and the hay, grain or the like is thus not flattened and crushed by the wheels of the tractor. Other farm implements may also be used in conjunction with my hitch to equal advantage.

Other objects, advantages and features of invention may appear from the accompanying drawing, the subjoined detail description and the appended claims.

The accompanying drawing illustrates the invention as applied to a tractor.

Figure 1:
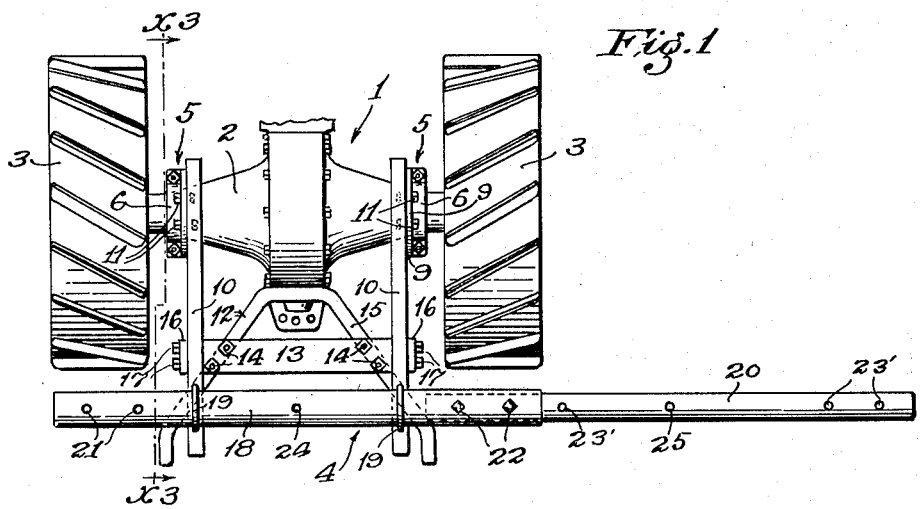
Figure 1 is a plan view of my hitch attached to a tractor a fragment of which is shown.
Figure 2:
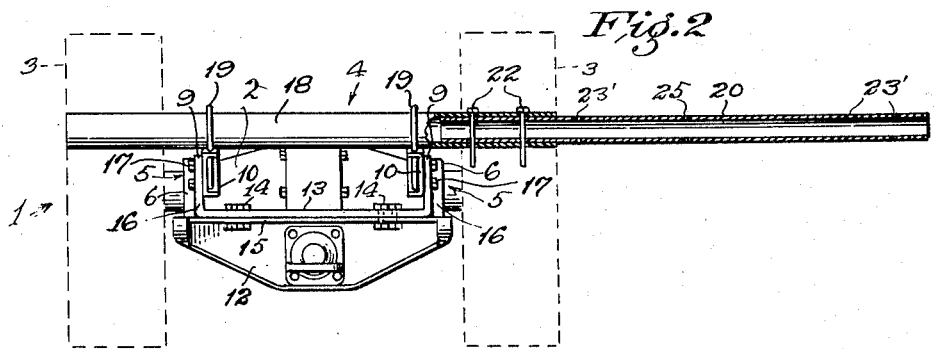
Fig. 2 is a rear elevation of my hitch with parts thereof broken away, the tractor being diagrammatically shown.

The tractor 1 has a rear axle housing 2 and rear wheels 3, all of which are of standard construction and well known in the art.

My hitch 4 comprises a pair of clamping members 5 which are secured to the axle housing 2 adjacent to the outer ends thereof. These members each consist of a plate 6 which is formed with an arcuate seat 7 to receive the axle housing 2. A U-bolt 8 is fastened in the plate 6 and extends under the housing 2, thus securely holding the clamping member 5 in place.

Each of the clamping members 5 is formed with an upstanding vertical flange 9, to which rearwardly extending arms 10 are securely fastened by means of bolts 11, or other suitable means. The arms 10 are preferably formed of channel bars, although other structural sections may be used.

Figure 3:
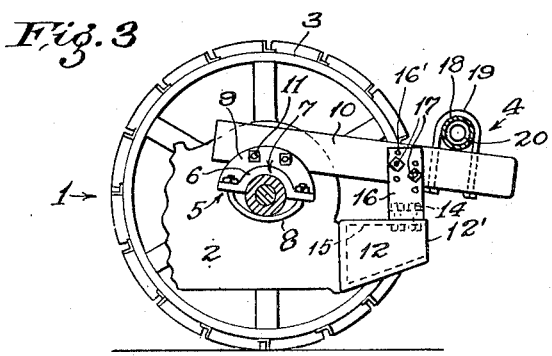
Fig. 3 is a sectional view on line $x^3$, Fig. 1 showing the rear ends of the usual fender wishbone cut off.

The usual tractor fender supporting rack 12 is secured in the usual manner to the rear axle housing and extends rearwardly therefrom. This rack is of well known and standard construction on the Fordson tractor as shown in Patent No. 1,463,944, granted August 27, 1925, and when my hitch is applied thereto the fenders are preferably removed. If desired the ends thereof may be cut off as shown at 12' in Fig. 3.

A plate 13 extends transversely of the tractor and is secured to the rack 12 adjacent the rear thereof, by bolts 14 extending through said plate and the top flange 15 of said rack, or by other suitable means. The ends of plate 13 are upturned forming angle members as at 16, and the arms 10 are secured to said members 16 by bolts 17 or other suitable means. The angle ends 16 are so formed and positioned that the arms 10 incline rearwardly and downwardly.

The angled ends 16 may be provided with a plurality of holes 16' through which the bolts 17 pass and thereby provide means whereby the hitch may be adjusted as to height.

A tubular draft member 18 extends transversely of the tractor and is secured to the arms 10 adjacent the rear ends thereof, by U-bolts 19. The member 18 is preferably a piece of 3 inch pipe having a length of about the width of the tractor, more or less. A longitudinally extensible hitch tube 20 is slidably mounted in the tube 18 and fits closely therein. The tube 20 is about the same length as the tube 18 and is adapted to extend from either end of the tube 18 and thus project to either side of the tractor.

Appropriate holes 21 are provided adjacent the ends of the tube 18, and pins 22 extend through said holes and through holes 23 in the tube 20. A plurality of holes 23' are provided in the tube 20 so that the amount of projection of said tube may be regulated as desired. A central hole 24 is formed in the tube 18 with which a central hole 25 in the tube 20 alines so that the implement may be drawn from a central point if desired. Of course it is understood that various combinations of holes may be made to provide for various points of connection.

The implement (not shown) is attached to the tube 20 when said tube is extended, by passing the clevis on said implement through one of the holes, 23 or 25. When not in use the tube 20 may be collapsed into the tube 18, and the draw bar will not prevent the tractor from passing through a gateway or the like.

I claim.

1. In a tractor comprising a rear axle housing; rearwardly extending arms; means securing said arms to said housing; a transversely extending extensible draft member; and means to secure said draft member to said arms, so that the same is capable of vertical adjustment with respect to the said arms.

2. In a tractor comprising a rear axle housing; clamping members bolted to said housing; a flange on said members; rearwardly extending arms secured to said flanges; a transversely extending extensible draft member; and means to secure said draft member to said arms, to permit the said draft member to be adjusted to different heights.

3. The combination with a tractor having a rear axle housing and a fender supporting rack; of clamping members secured to said housing; a flange on said members; rearwardly extending arms secured to said flanges; means securing said arms to said fender supporting rack; a transversely extending extensible draft member; and means to secure said draft member to said arms.

4. The combination with a tractor having a rear axle housing and a fender supporting rack; of clamping members connected to said housing; a flange on said members; rearwardly extending arms secured to said flanges; a plate secured to said fender supporting rack and having upturned ends; a transversely extending draft member; and means to secure said draft member to the upturned ends of said plate.

5. The combination with a tractor having a rear axle housing and a fender supporting rack; of clamping members bolted to said housing; a flange on said members; rearwardly extending arms secured to said flanges; a plate secured to said fender supporting rack; members extending upwardly from said plate and secured to said arms; a transversely extending tubular draft member secured to said arms; a hitch member slidable in said draft member, said hitch member and draft member having a plurality of holes therethrough; and means adapted to extend through alined holes in said draft member and hitch member to hold said hitch member in extended position.

In testimony whereof, I have hereunto set my hand at Los Angeles, California, this 10th day of September, 1925.

AUSTIN C. WHIDDEN.